US 8,098,393 B2
Jan. 17, 2012

(12) United States Patent
Saikawa (10) Patent No.: US 8,098,393 B2
(45) Date of Patent: *Jan. 17, 2012

(54) PRINT SYSTEM FOR RESUMING PRINTING OPERATION FOLLOWING AN OFF-LINE ERROR

(75) Inventor: Takashi Saikawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/181,165

(22) Filed: Jul. 12, 2011

(65) Prior Publication Data

US 2011/0267639 A1 Nov. 3, 2011

Related U.S. Application Data (63) Continuation of application No. 11/214,761, filed on Aug. 29, 2005, now Pat. No. 7,999,953.

(30) Foreign Application Priority Data

Aug. 27, 2004 (JP) ................................ 2004-249241

(51) Int. Cl.
G06F 3/12 (2006.01)
(52) U.S. Cl. ........... 358/1.15; 358/1.14; 714/2; 714/100
(58) Field of Classification Search .................. 358/1.15, 358/1.14; 714/2, 100
See application file for complete search history.

(56) References Cited

U.S. PATENT DOCUMENTS

| 6,095,632 | A | 8/2000 | Kobayashi et al. |
| 6,132,117 | A | 10/2000 | Fukano et al. |
| 6,328,410 | B1 | 12/2001 | Kawase et al. |
| 6,364,442 | B1 | 4/2002 | Kawase et al. |
| 6,491,453 | B1 | 12/2002 | Fukano et al. |
| 6,516,440 | B1 | 2/2003 | Teradaira |
| 6,811,334 | B2 | 11/2004 | Koike et al. |
| 7,916,316 | B2 | 3/2011 | Saikawa |
| 7,999,953 | B2 * | 8/2011 | Saikawa ........................ 358/1.14 |
| 2001/0001130 | A1 | 5/2001 | Miyasaka et al. |
| 2001/0024585 | A1 | 9/2001 | Koakutsu et al. |
| 2004/0101336 | A1 | 5/2004 | Azami |
| 2004/0218204 | A1 | 11/2004 | Nomura |
| 2004/0240921 | A1 | 12/2004 | Koike et al. |
| 2006/0055972 | A1 | 3/2006 | Saikawa |
| 2011/0181905 | A1 | 7/2011 | Saikawa |

FOREIGN PATENT DOCUMENTS

CN 1739975 A 3/2006

(Continued)

OTHER PUBLICATIONS

Pre-Brief Appeal Conference Decision, U.S. Appl. No. 11/214,761, dated Apr. 6, 2011.

(Continued)

Primary Examiner — King Poon
Assistant Examiner — Jamares Q Washington
(74) Attorney, Agent, or Firm — Nutter McClennen & Fish LLP; John J. Penny, Jr.; Michael P. Visconti, III (57) ABSTRACT

Described are a printer and a method of controlling it, in which discarding received data and clearing data from a receive buffer is started when an off-line error occurs and the printer goes off-line. When the printer returns on-line, a control unit causes a data receiving unit to stop discarding said received data and causes sending a clear response as an on-line status report telling the host computer that the printer is returning on-line.

3 Claims, 7 Drawing Sheets

FOREIGN PATENT DOCUMENTS

| | | | |
|---|---|---|---|
| EP | 0 652 533 | A2 | 5/1995 |
| EP | 0738596 | A1 | 10/1996 |
| EP | 0 777 174 | A1 | 6/1997 |
| EP | 0780786 | A2 | 6/1997 |
| EP | 0834800 | A1 | 4/1998 |
| EP | 0945824 | A2 | 9/1999 |
| EP | 1093052 | A2 * | 4/2001 |
| JP | 3091456 | A | 4/1991 |
| JP | 06210907 | A | 8/1994 |
| JP | 06210936 | A | 8/1994 |
| JP | 08-006744 | A | 1/1996 |
| JP | 8-011394 | A | 1/1996 |
| JP | 09095025 | A | 4/1997 |
| JP | 10211719 | A | 8/1998 |
| JP | 11-042832 | A | 2/1999 |
| JP | 11208071 | A | 8/1999 |
| JP | 11-268384 | A | 10/1999 |
| JP | 200035922 | A | 8/2000 |
| JP | 2001-180052 | A | 7/2001 |
| JP | 2002189640 | A | 7/2002 |
| JP | 2004-130784 | A | 4/2004 |

OTHER PUBLICATIONS

European Search Report dted Dec. 30, 2005.
Extended European Search Report dated Feb. 28, 2011.
Extended European Search Report dated Feb. 28, 2011 (EP Application No. EP10182680).
Final Office Action, U.S. Appl. No. 11/214,761, dated Apr. 15, 2010.
Final Office Action, U.S. Appl. No. 11/214,761, dated May 22, 2009.
Final Office Action, U.S. Appl. No. 11/215,445, dated Apr. 19, 2010.
Final Office Action, U.S. Appl. No. 11/215,445, dated Jul. 16, 2009.
Non-Final Office Action, U.S. Appl. No. 11/214,761, dated Dec. 21, 2010.
Non-Final Office Action, U.S. Appl. No. 11/214,761, dated Oct. 15, 2008.
Non-Final Office Action, U.S. Appl. No. 11/214,761, dated Oct. 15, 2009.
Non-Final Office Action, U.S. Appl. No. 11/215,445, dated Feb. 10, 2009.
Non-Final Office Action, U.S. Appl. No. 11/215,445, dated Nov. 24, 2009.
Notice of Allowance, U.S. Appl. No. 11/214,761, dated Apr. 15, 2011.
Notice of Allowance, U.S. Appl. No. 11/215,445, dated Nov. 30, 2010.
Pre-Brief Appeal Conference Decision, U.S. Appl. No. 11/214,761, dated Oct. 5, 2010.
Pre-Brief Appeal Conference Decision, U.S. Appl. No. 11/215,445, dated Sep. 21, 2010.
Non-Final Office Action, U.S. Appl. No. 13/034,113, dated Jun. 8, 2011.
Notice of Allowance, U.S. Appl. No. 13/034,113, dated Sep. 26, 2011.

* cited by examiner

PRINT SYSTEM FOR RESUMING PRINTING OPERATION FOLLOWING AN OFF-LINE ERROR

CROSS-REFERENCE TO RELATED APPLICATIONS

This patent application claims priority to Japanese Patent Application No. 2004-249241 filed on Aug. 27, 2004, the entire contents of which are incorporated herein by reference. This application is a continuation of U.S. application Ser. No. 11/214,761, filed on Aug. 29, 2005 now U.S. Pat. No. 7,999,953 and published as U.S. Publication No. 2006/0055972, the entire contents of which are incorporated herein by reference.

BACKGROUND OF THE INVENTION

1. Field of Technology

The present invention relates generally to a printer and a printer control method, and relates more particularly to the internal process of a printer when returning from an off-line status to an on-line status.

2. Description of Related Art

A printer system having a printer typically has the printer connected to enable communication with a host computer which generates the print data to be printed and controls printer operations. During printing, for example, the printer executes print control commands received from the host computer to print on slips or roll paper and then output the result.

When the paper runs out or a paper jam occurs inside the printer, the internal status of the printer generally goes from an on-line status, which is the printer state enabling printing, to an off-line status in which the printer does not print. If a receipt was being printed on roll paper, for example, printing the receipt is interrupted when the printer goes off-line. The printer then returns on-line when the cause of the printer going off-line is removed after the printer has gone off-line.

If the supply of roll paper inside the printer is depleted, for example, the printer is able to return on-line after a new roll of paper is loaded into the printer. If the roll paper jams inside the printer and the printer thus cannot advance the paper, correctly reloading the paper and then asserting a reset command enables the printer to return on-line.

However, if the roll paper supply runs out, a new roll is loaded into the printer, and the printer returns on-line and then resumes printing, the remaining print data, that is, the print data that was not printed before the printer went off-line, is printed to the roll paper after the printer returns on-line. This results in the receipt content that should normally be printed to a single continuous receipt being printed on two separate pieces of paper. A problem with this is that in some circumstances a receipt that is printed on two separate pieces of paper is meaningless as a receipt. As a result, the same receipt content must be sent from the host computer to the printer again for reprinting, and this wastes paper. This also drastically reduces printing efficiency considering the time and trouble involved with reprinting a receipt, and thus lowers productivity.

When the roll paper is reloaded correctly because the roll paper jammed and could not be fed, and the reset command is then asserted to return the printer on-line and resume printing, a portion of the printed paper is often skewed, creased, or badly wrinkled. As a result, the receipt content must be sent from the host computer to the printer again for reprinting. This also wastes paper, drastically reduces printing efficiency, and thus lowers productivity.

Furthermore, new print data received while the printer is off-line is stored in the receive buffer, but the storage capacity of the receive buffer is limited. This means that when a large amount of data such as for a bitmapped image is received, the receive buffer could become full, thus preventing receiving any more data.

JP-A-H11-268384 teaches a printer which receives from the host computer a command instructing the printer what process to execute when the printer returns from an off-line to an state; and the printer thus runs a process determined by the cause of the off-line status when the printer goes back on-line. This printer can thus be prevented from printing the remaining portion of a receipt that will most likely be unusable.

JP-A-2001-180052 teaches a printer which can select whether to store or to automatically discard new print data received while the printer is off-line. When the received data is automatically destroyed with this printer, additional data is not stored in the receive buffer while the printer is off-line, and the receive buffer will thus not become full.

The printer system taught in JP-A-H11-268384 makes no specific mention of the type of command that is communicated between the host computer and printer when the printer returns on-line and controls whether printing is resumed for a receipt for which printing was interrupted.

The printer taught in JP-A-2001-180052 resends print data from the host after the printer goes on-line again, but depending upon the print data transmission timing and the timing at which the printer returns on-line, data that should be abandoned may still remain in the receive buffer. Receipt data that should not be printed may thus be printed, and paper thus wasted.

It is an object of the present invention to provide a printer and a printer control method that allow smoothly resuming an interrupted printing operation with no wasted printing when the printer returns on-line from an off-line status.

SUMMARY OF THE INVENTION

A printer according to a first aspect of at least one embodiment of the present invention has a data receiving unit for receiving data sent from a host computer; a data transmission unit for sending data to the host computer; a receive buffer for temporarily storing data received by the data receiving unit; an interpreting unit for interpreting data temporarily stored in the receive buffer; a print buffer for storing a print image when the buffered data is print data; a print mechanism for printing the print image stored in the print buffer; and a control unit for controlling the data receiving unit, the data transmission unit, the receive buffer, the interpreting unit, the print buffer, and the print mechanism. The control unit causes the data receiving unit to start discarding received data and clears the data in the receive buffer when an off-line error occurs. When returning on-line, the control unit causes the data receiving unit to stop discarding the received data and causes the data transmission unit to send an on-line status report to the host computer. After then receiving a clear buffer command from the host computer, the control unit clears the receive buffer again.

Preferably, the control unit clears the print buffer when returning to the on-line state, and then clears the print buffer again according to the clear buffer command.

Yet further preferably, the control unit sends a buffer clearing completion report to the host computer after receiving the clear buffer command, and then prints based on print data received from the host computer after sending the buffer clearing completion report.

Another aspect of at least one embodiment of the present invention is a printer control method having steps of starting discarding received data and clearing a receive buffer when an off-line error occurs; stopping discarding the received data and sending an on-line status report to a host computer when returning on-line; and clearing the receive buffer again according to a cleat buffer command received from the host computer.

Preferably, this printer control method also has a step of clearing a print buffer when returning to the on-line state and then clearing the print buffer again according to the clear buffer command.

Yet further preferably, this printer control method also has steps of sending a buffer clearing completion report to the host computer after receiving the clear buffer commend; and printing based on print data received after sending the buffer clearing completion report.

If an error causing the printer to go off-line occurs while printing is in progress and printing is thus interrupted, the receive buffer and the print buffer are both cleared twice regardless of whether the print data for the receipt for which printing was interrupted was not received by the printer, was being received, or is received after the interrupt. As a result, no data to be printed remains in the printer when the printer is again able to print. As a result, the remaining portion of the receipt that was being printed before the error causing the off-line state (referred to herein as an "off-line error") occurred is not printed when the printer returns on-line, and roll paper is thus not wasted.

The host computer then resends to the printer the print data for which printing was interrupted, thus enabling the printer to reprint the receipt in a single continuous printing operation. A drop in efficiency caused by the printer going off-line while printing is in progress can thus be minimized while also enabling printing to continue without interruption.

A further advantage of the present invention in a printer requiring ink or toner for printing is that the useful service life of the ink cartridge or toner cartridge can be extended because the consumption of ink or toner is thus also reduced in addition to reducing paper consumption.

Other objects and attainments together with a fuller understanding of the invention will become apparent and appreciated by referring to the following description of preferred embodiments taken in conjunction with the accompanying drawings.

DESCRIPTION OF THE PREFERRED EMBODIMENTS

Preferred embodiments of a printer and printer control method according to the present invention are described below with reference to the accompanying figures.

Figure 1:
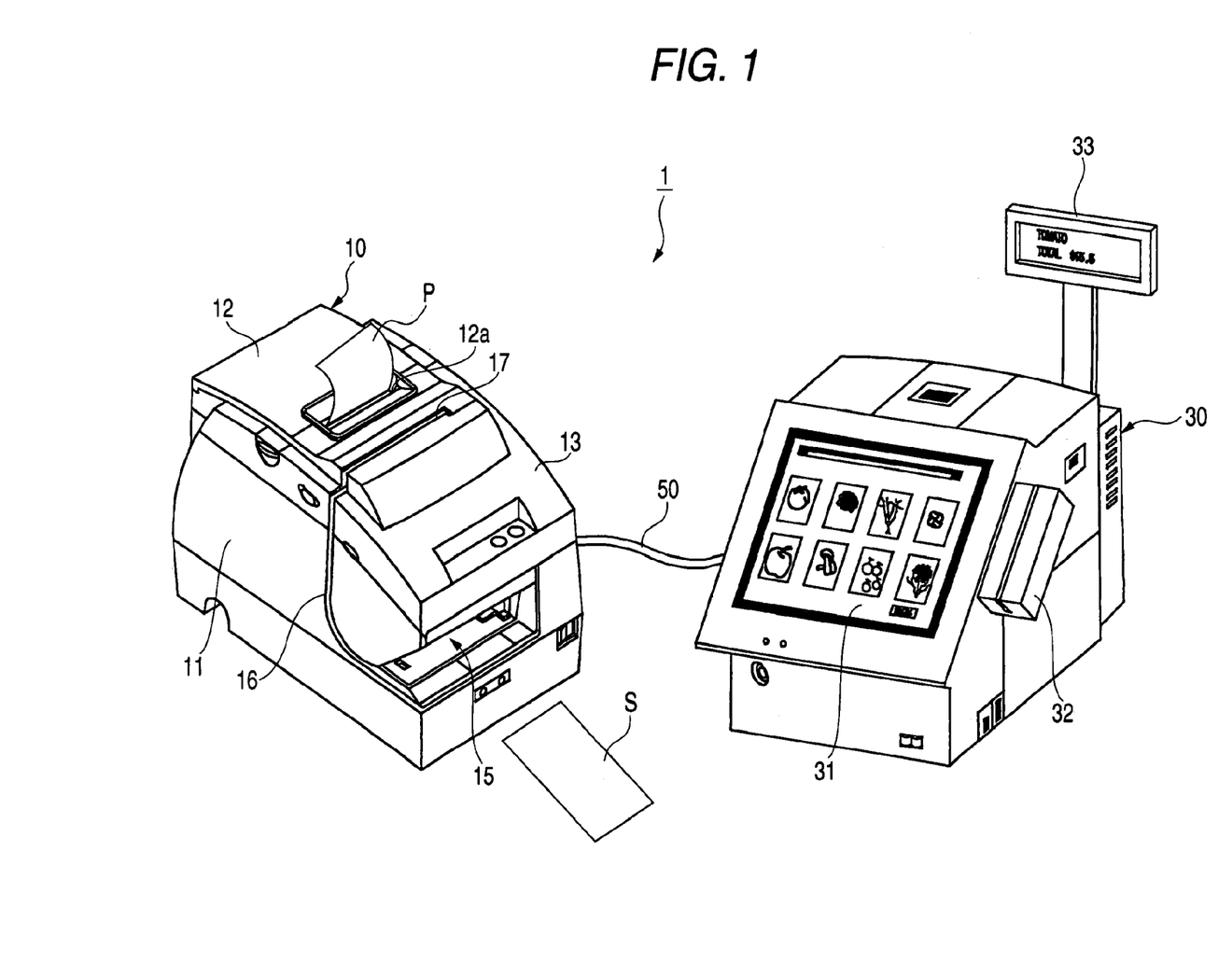
FIG. 1 is an perspective view showing a printer system according to a preferred embodiment of the present invention.

As shown in FIG. 1, a printer system 1 according to a preferred embodiment of the invention includes a printer 10 and a host computer 30 controlling the printer 10. The printer 10 is a hybrid device capable of printing both sides of a slip S, scanning the slip 5, reading magnetic ink characters on the as slip S, and printing a receipt on roll paper P.

The printer 10 has a front cover 13 attached openably and closably to the main unit 11 so as to cover the front top part of the main unit 11, and a back cover 12 attached openably and closably so as to cover the top rear portion of the front cover 13.

A roll paper compartment is formed between the back cover 12 and the main unit 11 of the printer 10. Roll paper P is held in this roll paper compartment. The roll paper P is printed by a print head not shown while being advanced through a roll paper transportation path rendered inside the main unit 11. The printed roll paper P is then discharged from a roll paper exit 12a formed in the top of the back cover 12. The leading end of the roll paper P is shown discharged from the roll paper exit 12a in FIG. 1. This roll paper P is cut either automatically or manually according to the length of the print data and then issued as a single receipt.

A check insertion slot 15 for inserting a slip S is formed below the front cover 13 of the printer 10. A slip S inserted from the check insertion slot 15 is conveyed through the check transportation path 16 formed in the main unit 11, and is discharged from a check exit 17 formed between the front cover 13 and back cover 12. The slip S can be printed and scanned, and magnetic ink characters printed on the slip S can be read, while the slip S is conveyed through the check transportation path 16.

A printer 10 according to this embodiment of the invention also has a CPU and Internal memory. The CPU reads and runs firmware stored to nonvolatile memory such as flash ROM, for example, to control printer operations, including printing. Control of this printer 10 is described more specifically is below.

The host computer 30 is described first next.

The host computer 30 is connected by a serial cable, USB cable, or other communication cable. Although not shown, the printer and the host computer could alternatively be connected to communicate wirelessly. The host computer 30 in this embodiment of the Invention has input devices such as a touch panel 31 and card reader 32, generates print data based on input from the touch panel 31 and card reader 32, and sends the resulting print data to the printer 10 over the communication cable. The printer 10 then prints on roll paper or a slip based on this print data.

A host computer having a touch panel 31 and card reader 32 is used by way of example in the present embodiment of the invention. Any device capable of controlling the printer 10 can be used instead, and the host computer could be based on a common personal computer, for example.

Internal processes of the printer 10 are described next.

Figure 2:
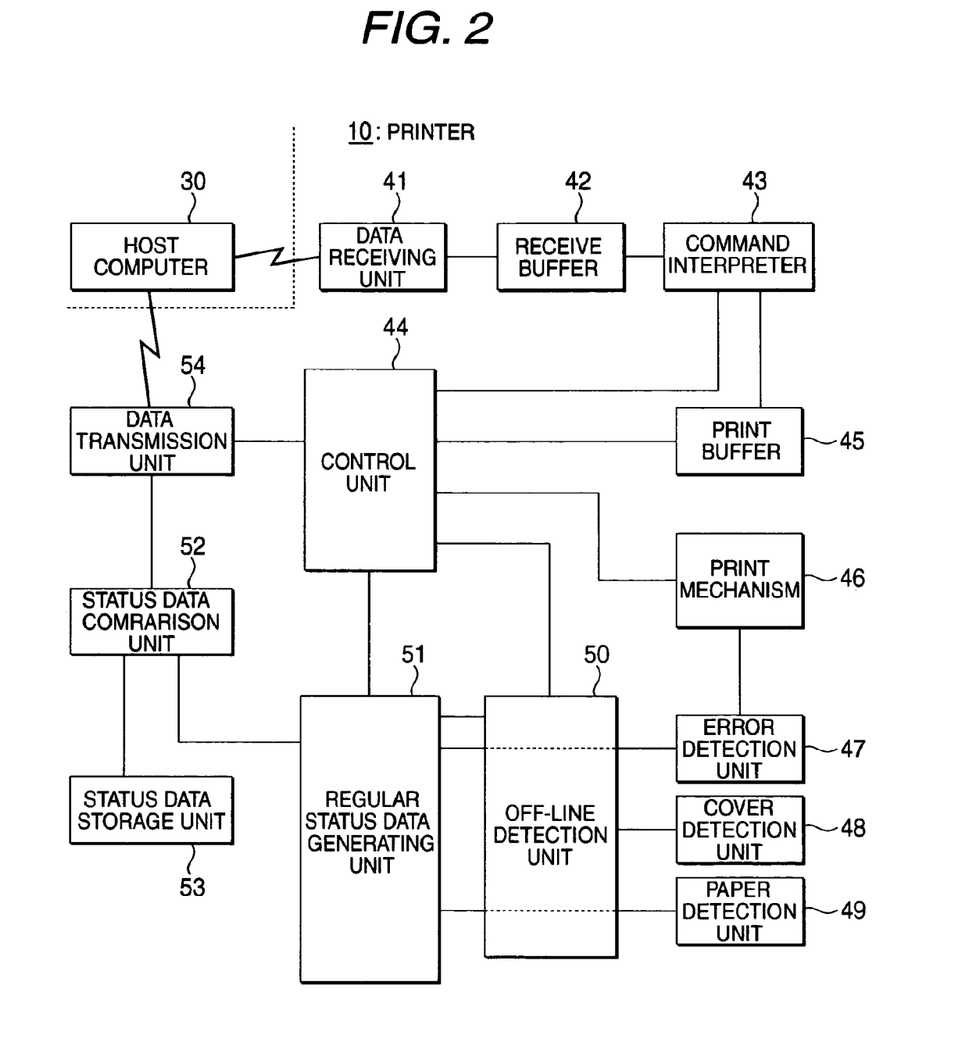
FIG. 2 is a schematic function block diagram showing the control configuration of the printer system shown in FIG. 1.

As shown in FIG. 2, the printer 10 has an internal data receiving unit 41, receive buffer 42, command interpreter 43, control unit 44, print buffer 45, print mechanism 46, error detection unit 47, cover detection unit 48, paper detection unit 49, off-line detection unit 50, regular status data generating unit 51, status data comparison unit 52, status data storage unit 53, and data transmission unit 54.

The data receiving unit 41 is a data communication unit for receiving print data and commands sent from the host computer 30, and includes a communication interface. The data receiving unit 41 sequentially stores the received data in the receive buffer.

The receive buffer 42 is a data storage unit of a line buffer or ring buffer type, and stores the data received by the data receiving unit 41 in the order received.

The command interpreter 43 reads the data stored in the receive buffer 42 in a first-in, first-out (FIFO) sequence and interprets the content. If the received data is print data, the print data is converted to a bitmap image in the print buffer 45 with reference to a font ROM, for example. If the received data is a control command for the printer 10, the control unit 44 controls the other function units according to the command content and thus provides overall control of the printer 10.

The print mechanism 46 is a printing unit for driving transportation rollers not shown to advance the paper while driving a print head to print. The print mechanism 46 renders paper transportation control and print head control based on the print image written to print buffer 45, and thus prints on a slip S or roll paper P.

The error detection unit 47 is a detection unit for sensing if a paper jam error or other error occurs during printing, paper transportation, or when cutting the paper. The error detection unit 47 outputs a detection signal to the off-line detection unit 50 when an error occurs.

The cover detection unit 48 is a detection unit for sensing if the front cover 13 or back cover 12 is open or closed. The cover detection unit 48 outputs a detection signal to the off-line detection unit 50 when the front cover 13 or back cover 12 is open.

The paper detection unit 49 is a detection unit for sensing if roll paper P is present. If the roll paper supply is depleted and there is no roll paper P in the printer 10, the paper detection unit 49 outputs a detection signal to the off-line detection unit 50.

The off-line detection unit 50 is a detection unit for sensing whether to set the internal status of the printer 10 to the off-line mode or on-line mode. The off-line detection unit 50 tells the control unit 44 to take the printer 10 off-line or on-line according to the detection signals from the error detection unit 47, cover detection unit 48, and paper detection unit 49. The control unit 44 thus switches the internal off-line/on-line status of the printer 10 as instructed by the off-line detection unit 50.

The condition for switching to the off-line status is when any one of the detection units 47 to 49 outputs an error signal (denoting a paper jam, open cover, or no paper). When the cause of the error is then removed and a detection signal denoting an error is not output from any of the detection units 47 to 49, normal printer operation is possible again and the off-line detection unit 50 instructs the control unit 44 to go on-line again.

The regular status data generating unit 51 monitors the status of the error detection unit 47, cover detection unit 48, paper detection unit 49, and off-line detection unit 50; and regularly collects and generates printer status data based on outputs from these other units. The regular status data generating unit 51 outputs the resulting status data to the status data comparison unit 52 as the status data is generated.

The status data comparison unit 52 is a comparator for comparing the current status data generated by the regular status data generating unit 51 and the previous status data stored in the status data storage unit 53. Note that the status data stored in the status data storage unit 53 is the previous status data produced by the regular status data generating unit 51. Thus, comparing this status data enables knowing if the internal status of the printer 10, which is denoted by the current status data detected when the status data was most recently monitored, has changed from the internal status of the printer 10 as denoted by the status data detected the previous time the status data was monitored.

If the status data produced by the regular status data generating unit 51 is the same as the status data previously stored in the status data storage unit 53, the internal status of the printer 10 has not changed and the comparison process ends. If the previous and current status data are different, there has been a change In the internal status of the printer 10. The status data comparison unit 52 therefore updates the status data stored in the status data storage unit 53 to the new (current) status data, and sends the current status data as a status signal through the data transmission unit 54 to the host computer 30. This process is known as an Automatic Status Back (ASB) function, and this is ASB function enables the host computer 30 to always know the current internal status of the printer 10.

The processes run in this embodiment of the invention When the printer goes off-line because there is no roll paper P is described in detail below.

A printer 10 according to this embodiment of the invention can select the operation for returning from the off-line state to the on-line state as a result of receiving a reset operation setup command (1) as shown below from the host computer 30:

$$GS(J2m \tag{1}$$

where m=0 or 1. "GS (J2" denotes the reset operation setup command relating to the process for recovering from an interruption of printing on roll paper P because the roll ended. When argument m=0, the control unit 44 runs the normal operating process. When argument m=1, the control unit 44 so runs a process for preventing wasting printing and paper when returning on-line. More specifically, the printer 10 runs the internal processes described below depending upon whether m=0 or m=1. The following processes are executed automatically when returning from the off-line state to the on-line state.

When m=0: normal operation
  (1) Do not clear the receive buffer and the print buffer,
  (2) If a command was being processed when the error causing the printer to go off-line (off-line error) occurred, the corresponding command process continues.

When m=1: paper-saving mode
  (1) Clear the receive buffer and the print buffer;
  (2) If a command was being processed when the off-line error occurred, abort the corresponding command process;
  (3) Discard and do not store in the receive buffer any data received from when the off-line error occurred until the off-line state is cancelled and the printer returns on-line (this process is not part of the process returning the printer on-line);
  (4) Send a clear response to the host computer 30.

Figure 3:
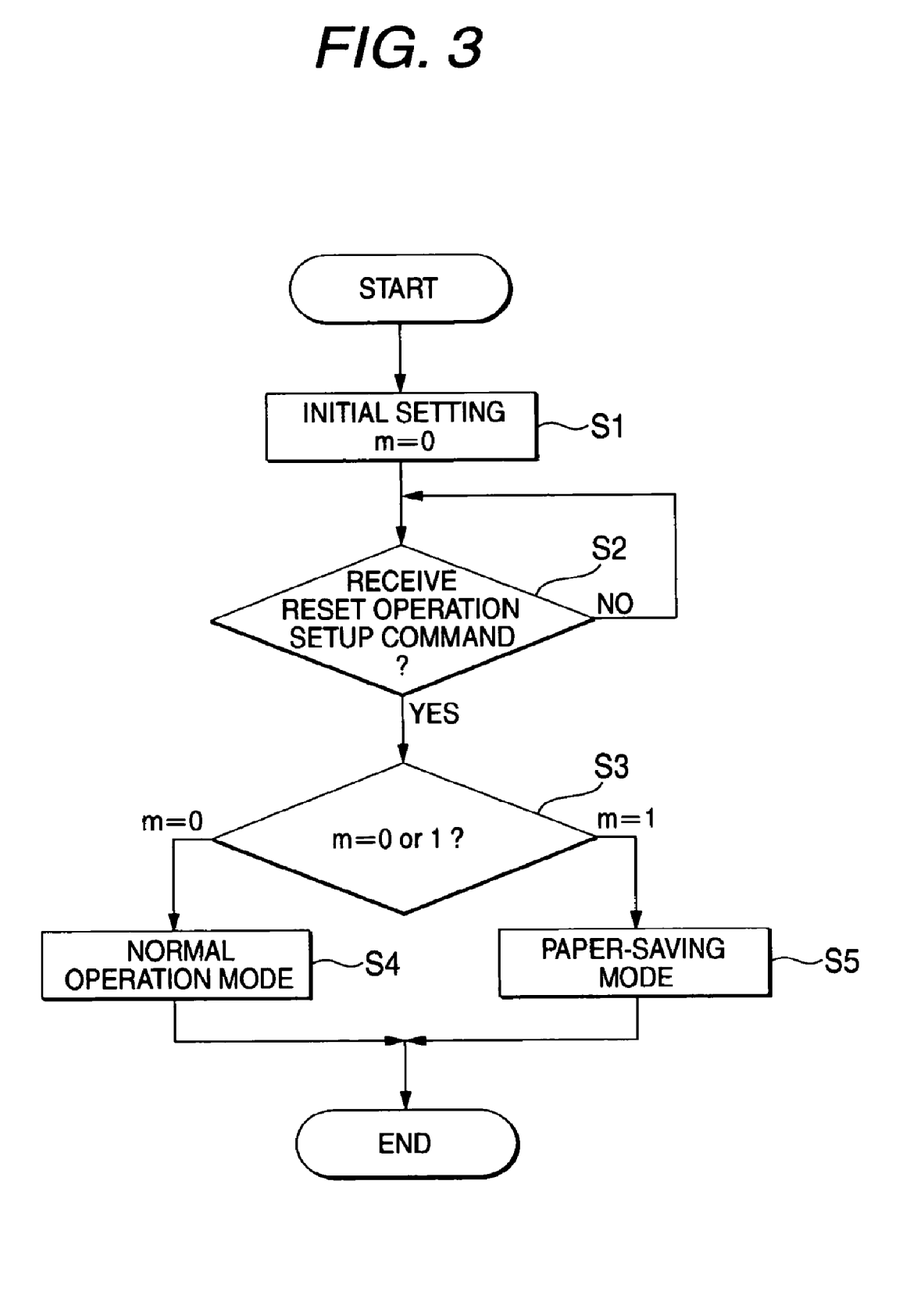
FIG. 3 is a flow chart of a printer control process.

This process is described further below with reference to FIG. 3. When this process starts, the printer 10 is initially set to m=0, and the printer 10 changes the operating mode when the command shown in statement (1) above is received. More specifically, the printer 10 is set to the normal operating mode based on the initial m=0 setting (step S1), and waits to receive the reset operation setup to command In step S2.

When the reset operation setup command is then received, the printer 10 reads the value of argument m (step S3). If m=0, the normal operating modes is reset in step S4. If m=1, the paper saving mode is set in step S5. The reset operation setup command can be set by the host computer 30 according to the type of printing as specified by the user.

The paper-saving mode which is executed when m=1 is described in detail next.

Figure 4:
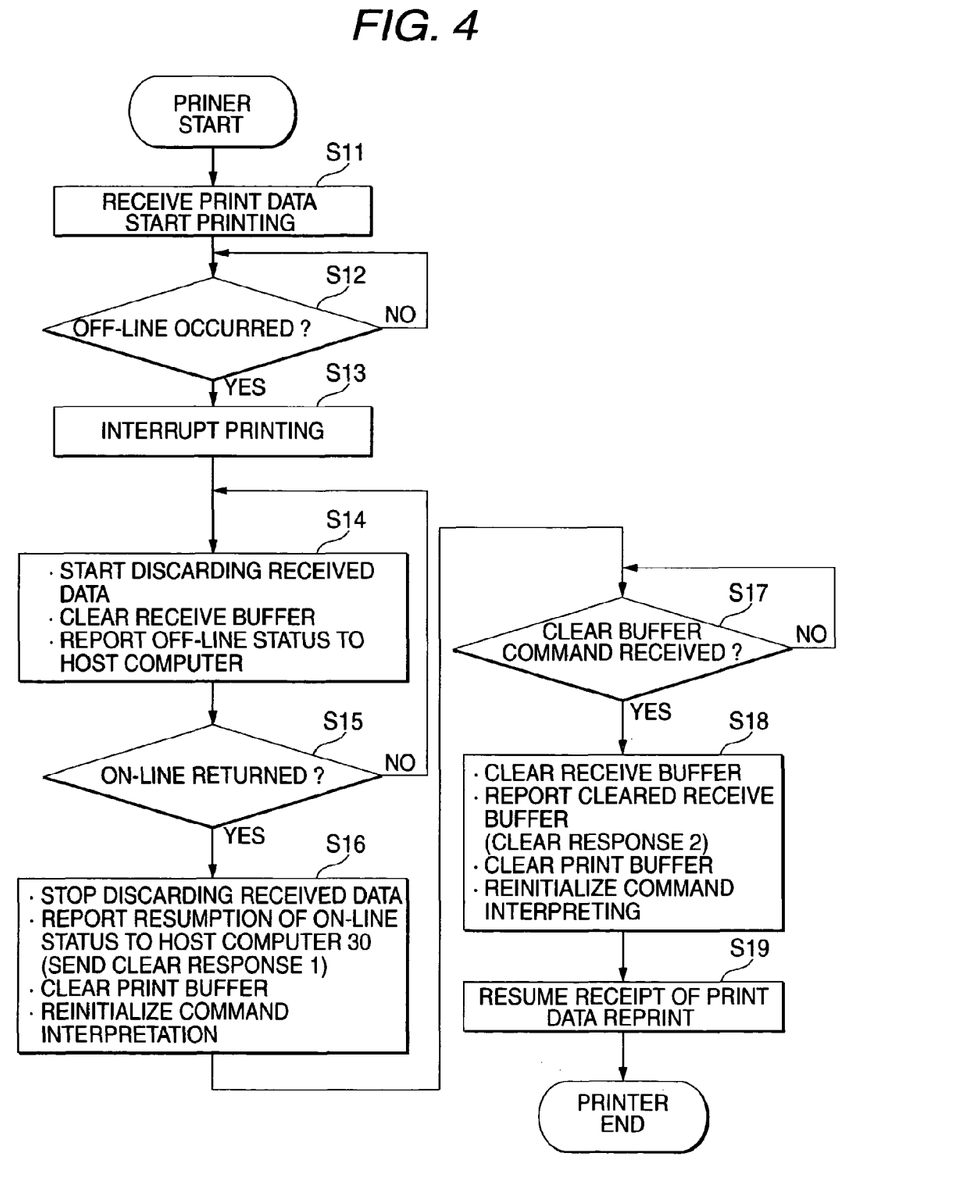
FIG. 4 is a flow chart of a printer control process.
Figure 5:
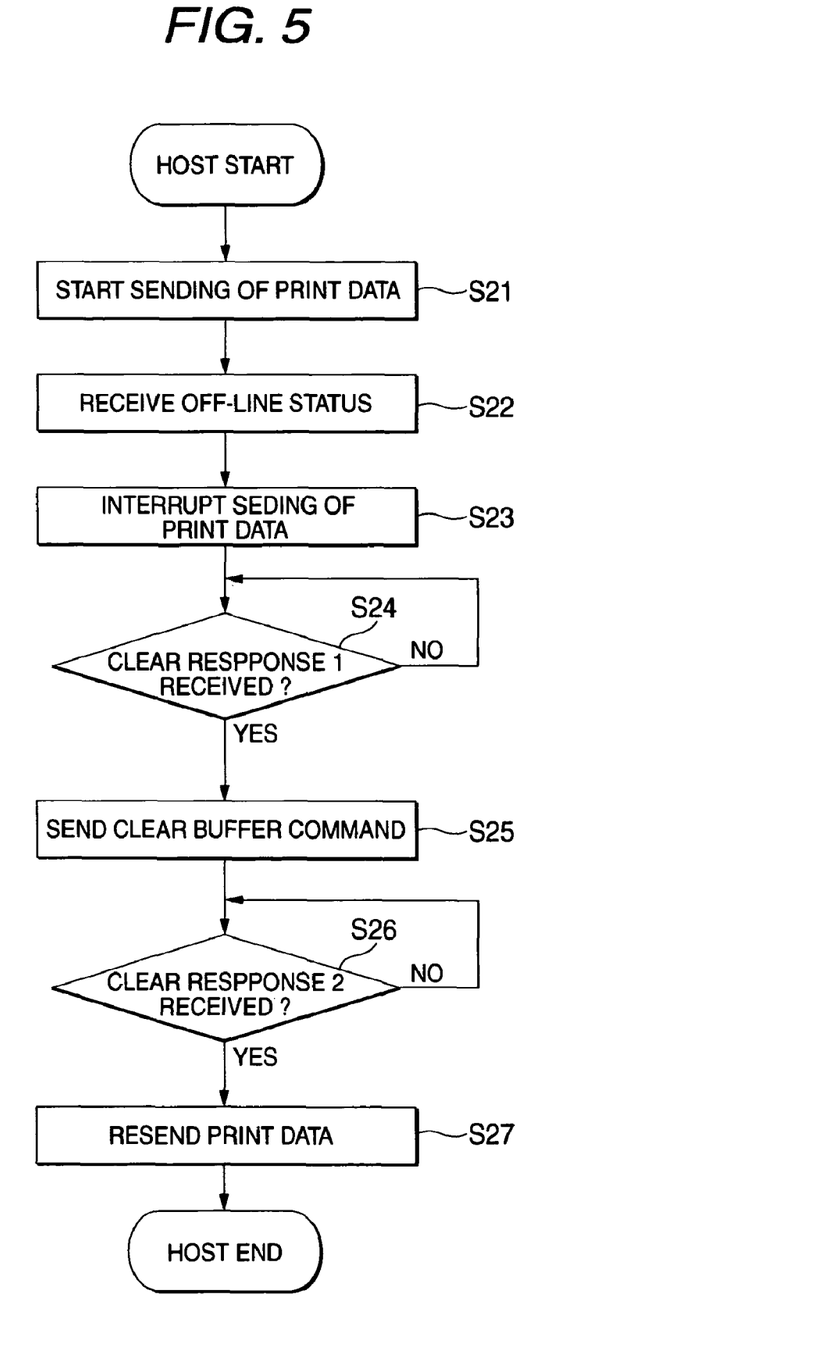
FIG. 5 is a flow chart of a host computer control process.
Figure 6:
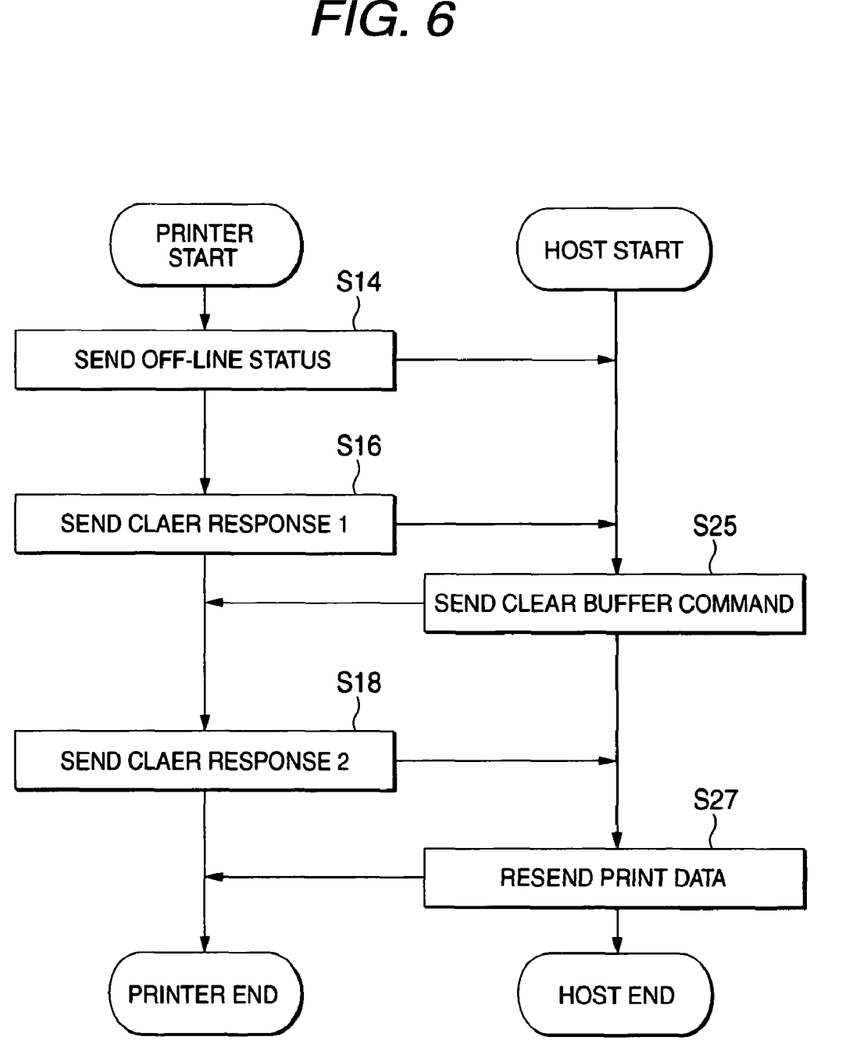
FIG. 6 is a timing chart showing commands sent between the host computer and printer.

FIG. 4 is a flow chart showing the process run by the printer 10 in the paper-saving mode when m=1. FIG. 5 is a flow chart showing the process run by the host computer 30 in the paper-saving mode when m=1. FIG. 6 is a timing chart showing the commands communicated between the host computer and printer. The processes executed by the printer 10 and host computer 30 are described in chronological order with reference to FIG. 4, FIG. 5, and FIG. 6 below.

When the printer 10 is on-line and the host computer 30 sends print data for one receipt to the printer 10 as shown in FIG. 5 (step S21), the printer 10 receives the print data and starts printing to the roll paper P by means of the print mechanism 46 as shown in FIG. 4 (step S11).

The printer 10 then continues printing white monitoring whether an error causing the printer 10 to go off-line has occurred (step S12). When the off-line detection unit 50 determines that the roll paper has run out and an off-line error has thus occurred as in this example, printing to the roll paper P is interrupted (step S13), and the control unit 44 of the printer 10 executes the following three processes (step S14):

(a) Start discarding received data (b) Clear receive buffer (c) Report off-line status to host computer In process (a) the data receiving unit discards all print data and commands sent from the host computer 30 after the off-line error occurred, and this data is thus not stored in the receive buffer 42. This prevents the receive buffer 42 from becoming full while the printer 10 is off-line.

Process (b) discards the data that was received from the host computer 30 before the off-line error occurred and is stored in the receive buffer 42. The data stored in the receive buffer 42 may include unprinted data that should be printed on the receipt that was being printed when printing was interrupted, and this unprinted data is also deleted from printer 10 memory. This prevents the continuation of printing of the unprinted data when the printer 10 returns on-line and thus prevents issuing a partial receipt containing only the remaining unprinted portion of the interrupted receipt.

Process (c) tells the host computer 30 that the printer 10 went off-line. The off-line error causes the status data output by the regular status data generating unit 51 to change from the data stored in the status data storage unit 53, and the status signal is thus automatically sent through the data to transmission unit 54 to the host computer 30 in this process (c).

The off-line detection unit 50 of the printer 10 then monitors if the cause of the off-line state has been removed, and the printer 10 waits until the problem is resolved (step S15).

Meanwhile, as shown in FIG. 5, when the host computer 30 receives the status signal in step S22 and thus knows that the printer 10 went off-line, the host computer 30 immediately interrupts sending print data to the printer 10 (step S23). The host computer 30 receives a print termination command from the printer 10 each time printing one line of print data ends, and stores all of the print data that is sent or is to be sent to the printer 10 for one receipt until a print termination command indicating that the last line of the receipt being printed has been printed is received from the printer 10. As shown in FIG. 4 and FIG. 5, if the printer 10 goes off-line while printing is in progress and the last line of the receipt is not printed, the print data for that receipt is saved for retransmission after the printer 10 goes back on-line.

If the error is corrected and the printer 10 returns on-line in step S15 (FIG. 4), the control unit 44 of the printer 10 executes the following four processes in step S16:

(e) Stop discarding received data (f) Report resumption of on-line status to host computer 30 (send clear response 1)

(g) Clear print buffer (h) Reinitialize command interpretation

Process (e) stops discarding the received data, an operation that was started by process (a) in step S14, and resumes buffering the received data In the receive buffer 42 as usual.

Process (f) sends clear response 1, which reports to the host computer 30 that the printer 10 has returned on-line. Sending this clear response 1 enables the host computer 30 to begin resending the print data to the printer 10.

Process (g) clears the print image data stored in the print buffer 45. If the printer goes off-line while printing is in progress, unprinted print image data is likely to be left in the print buffer 45 when the printer 10 goes off-line. This remaining data is therefore cleared from memory to prevent unnecessary printing.

Process (h) reinitializes the command interpreting process of the command interpreter 43, ignores the print data that was being processed, and starts interpreting commands for the data received next.

After executing processes (e) through (h), the printer 10 waits until a new command, particularly a clear buffer command, is received from the host computer 30 (step S17). This clear buffer command is described further in detail below.

The host computer 30 returns a clear buffer command to the printer 10 when clear response 1 is received from the printer 10. This clear buffer command is a command causing the printer 10 to clear the receive buffer and the print buffer again.

Clearing the buffers a second time may be considered unnecessary because the printer 10 has already cleared the receive buffer and the print buffer in steps S14 and S16, but clearing the buffers may be necessary for the reasons described below.

No problem is likely to occur if all data already sent from the host computer 30 has been cleared when process (e) runs and buffering in the receive buffer 42 resumes. However, if for some reason the on-line state is restored and buffering in the receive buffer 42 resumes before the host computer 30 executes step S23, print data that should be cleared may still be buffered in the receive buffer 42.

Figure 7:
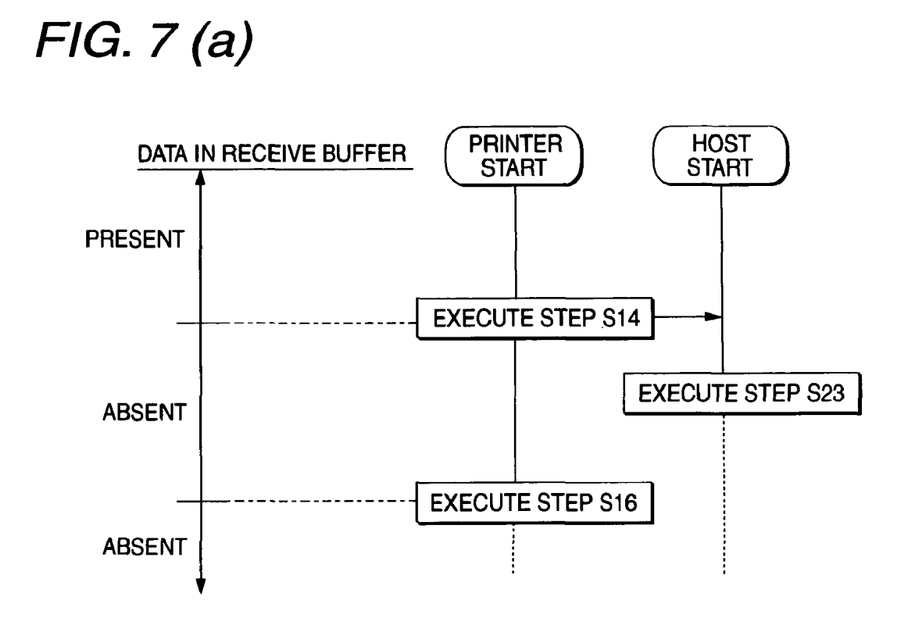
FIGS. 7(a) and 7(b) describe the need for a clear buffer command.

This is described more specifically with reference to FIG. 7. As shown in FIG. 7(a), if the printer 10 starts discarding the received data in step S14, the host computer 30 then interrupts sending print data in step S23, and the printer 10 then resumes buffering the received data in the receive buffer 42 in step S16, data does not accumulate in the receive buffer 42 after step S14 executes until the host computer 30 starts resending the print data.

As shown in FIG. 7(b), however, if the printer 10 starts discarding the received data in step S14 and the printer 10 then executes step S16 and resumes buffering data in the receive buffer 42 before the host computer 30 executes step S23 and aborts sending print data, the remaining data for the interrupted receipt, which is to be thrown away, will be stored in the receive buffer 42 after the printer 10 executes step S16 until the host computer 30 interrupts sending the print data.

Considering the situation described in FIG. 7(b), therefore, the receive buffer 42 is preferably cleared again after step S16 executes. The clear buffer command sent in step S25 is the command for thus clearing the buffers.

When the printer 10 receives the clear buffer command, the control unit 44 executes the following four processes in step S18:
 (i) Clear receive buffer
 (j) Report cleared receive buffer (clear response 2)
 (k) Clear print buffer
 (l) Reinitialize command interpreting Considering the situation described in FIG. 7(b), step S18 thus repeats the buffer clearing and initialization operations of the processes executed in step S14 and step S16. Step S18 then also sends a clear response 2 to the host computer 30 and the host computer 30 thus knows that the buffer has been cleared.

The host computer 30 waits in step S26 to receive the clear response 2, and in step S27 resends the print data for the receipt for which printing was interrupted when the clear response 2 is received.

The printer 10 thus resumes receiving the receipt print data from the host computer 30, and reprints the entire receipt from the beginning based on the received print data.

Processing by the foregoing printer 10 according to this embodiment of the invention is described above.

As described above a printer 10 according to this embodiment of the invention has a data receiving unit 41 for receiving data sent from a host computer 30, a data transmission unit 54 for sending data to the host computer 30, a receive buffer 42 for temporarily storing data received by the data receiving unit 41, a command interpreter 43 for interpreting data temporarily stored in the receive buffer 42, a print buffer 45 for storing print image data when the data interpreted by the command interpreter 43 is print data, a print mechanism 46 for printing based on the print image written to the print buffer 46, and a control unit 44 for controlling the data receiving unit 41, receive buffer 42, command interpreter 43, print buffer 45, and print mechanism 46. When an off-One error occurs the control unit 44 starts discarding the data received by the data receiving unit 41 and clears the data stored in the receive buffer 42. When the printer returns on-line, the control unit 44 stops discarding the data received by the data receiving unit 41 and the data transmission unit 54 sends clear response 1 telling the host computer 30 that the printer 10 is returning on-line. The control unit 44 then clears the receive buffer 42 again according to a clear buffer command received from the host computer 30.

More specifically, the control unit 44 clears the print buffer 45 when returning on-line, and again clears the print buffer 45 in response to a clear buffer command from the host computer 30.

Therefore, when an off-line error occurs while printing is in progress and printing is thus interrupted, print data relating to the receipt for which printing was interrupted is not sent to the printer 10, and even if this receipt print data was already received or is later received, no data to be printed remains in the printer 10 when the printer 10 is again able to print because the receive buffer 42 and the print buffer 45 are both cleared twice. The remaining unprinted portion of the receipt that was being printed when the off-line error occurred will thus not be printed when the printer returns on-line, and roll paper will thus not be wasted.

Furthermore, a single continuous receipt can be smoothly printed because the host computer 30 resends all print data for the interrupted receipt to the printer 10 after the printer 10 returns on-line.

The drop In efficiency can thus be minimized and continuous printing can be resumed even if an off-line error occurs during printing.

The present invention has been described using by way of example a printer as shown In FIG. 1. The invention is not limited, however, to this particular printer and can be applied to various kinds of printers, including inkjet printers, laser printers, dot impact printers, and thermal printers. When applied in a printer that requires ink or toner to print, the present invention reduces ink and toner consumption In addition to reducing paper consumption, and thus also contributes to extending the useful service life of ink cartridges and toner cartridges.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

The invention claimed is:

1. A print system comprising:
 a printer; and
 a host computer which is communicatably connectable to the printer and is configured to send data including print data to the printer,
 wherein the printer includes:
  a data transmission unit which is configured to send data to the host computer;
  a data receiving unit which is configured to receive data sent from the host computer;
  a receive buffer which is configured to temporarily store the data received by the data receiving unit;
  an interpreting unit which is configured to interpret the data stored in the receive buffer;
  a print buffer which is configured to store print image generated in response to the print data among the data stored in the receive buffer;
  a print mechanism which is configured to print the print image stored in the print buffer; and
  a control unit which is configured to control the data transmission unit, the data receiving unit, the receive buffer, the interpreting unit, the print buffer and the print mechanism,
 wherein when an off-line error occurs in the printer, the control unit causes the data receiving unit to start discarding the data sent from the host computer and clears the data stored in the receive buffer,
 wherein when the printer returns to an on-line state, the control unit causes the data receiving unit to stop discarding the data sent from the host computer and causes the data transmission unit to send an on-line status report to the host computer,
 wherein when the host computer receives the on-line status report from the printer, the host computer sends a clear buffer command to the printer,
 wherein when the data receiving unit receives the clear buffer command from the host computer, the control unit clears the receive buffer again, causes the data transmission unit to send a buffer clearing completion report to the host computer, and
 wherein after sending the buffer clearing completion report, the control unit causes the print mechanism to print based on the print data sent from the host computer.

2. The print system as described in claim 1, wherein the control unit clears the print buffer when the printer returns to the on-line state, and clears the print buffer again in response to the clear buffer command.

3. The printer system as described in claim 1, wherein the control unit causes the interpreting unit to reinitialize command interpreting when the printer returns to the on-line state, and again causes the interpreting unit to reinitialize command interpreting in response to the clear buffer command.

* * * * *